United States Patent [19]

Hyanova et al.

[11] 3,942,049

[45] Mar. 2, 1976

[54] PIEZOELECTRIC PICK-UP DEVICE FOR MEASURING PRESSURES WITHIN HOLLOW BODIES

[75] Inventors: Blanka Hyanova; Vladimir Plasil, both of Prague, Czechoslovakia

[73] Assignee: CKD Praha, oborovy podnik, Prague, Czechoslovakia

[22] Filed: Aug. 30, 1974

[21] Appl. No.: 502,067

[30] Foreign Application Priority Data

Aug. 30, 1974 Czechoslovakia .................. 6066-74

[52] U.S. Cl. ................ 310/9.1; 73/194 A; 310/8.3; 310/8.7
[51] Int. Cl.² .......................................... H01L 41/04
[58] Field of Search ............... 310/8.5, 8.6, 8.7, 8.9, 310/9.1, 9.4, 8.3; 73/194 A, 194 B, 67.5 R, 71.5 US

[56] References Cited

UNITED STATES PATENTS

| | | | |
|---|---|---|---|
| 3,101,420 | 8/1963 | Hufferd et al. ...................... | 310/8.7 |
| 3,105,380 | 10/1963 | Stebbins ........................... | 310/8.7 X |
| 3,204,458 | 9/1965 | Gillen ............................... | 73/194 A |
| 3,248,933 | 5/1966 | Stebbins ........................... | 310/9.1 X |
| 3,357,243 | 12/1967 | Woodcock ........................ | 73/194 A |
| 3,568,661 | 3/1971 | Franklin ........................... | 73/194 A |

*Primary Examiner*—Mark O. Budd

[57] ABSTRACT

Piezoelectric pick-up device for measuring internal overpressure of hollow bodies such as cylindrical pipes. The device has similar parts which present a cavity therebetween with a circular cross section with a circular groove. Within the groove there is disposed an insert composed of four parts, said insert encompassing the hollow body and transmits the deformations of the hollow body due to overpressure therewithin to piezoelectric plates. The four parts of the insert are advantageously made of steel.

2 Claims, 2 Drawing Figures

PIEZOELECTRIC PICK-UP DEVICE FOR MEASURING PRESSURES WITHIN HOLLOW BODIES

BACKGROUND OF THE INVENTION

This invention relates to a piezoelectric pick-up device for measuring pressures within cylindrical hollow bodies on the basis of their elastic deformation, said pick-up device having a body composed of two parts with a cavity with a circular cross section, in the wall of which there are provided at least two motion transmitting elements and piezoelectric plates.

Hollow bodies, the internal overpressure of which is variable in the course of operation, are generally also stressed, in addition to internal overpressure, by bending stresses and additionally by vibrations. For instance, an injector tube of a diesel engine, on the surface of which tube the course of pressure of the injected fuel is picked-up for diagnostic measurements, forms with the injection pump, the injector, and the engine proper a system oscillating as a unit. Furthermore, the injection tube oscillates, as an elastic element of this system, at its own damped resonant oscillations, which are generated due to quick pressure variations in the tube, the frequency of such oscillations being generally within the limits of 5 to 20 kilocycles.

A number of measuring methos are known for measuring internal overpressures. For diagnostic measurements indirect methods are generally used, such methods consisting in pickingup deformations of an elastic body which depend upon variations of the internal overpressure. Due to their simplicity of design and manufacture, piezoelectric pick-up devices have a high sensibility and a good reproducibility of results. The main drawback of known pick-up devices is the impossibility of eliminating influences due to vibrations and elastic deformations of the measured body, which generate error signals, thereby distorting the results of measuring the internal overpressure of the body.

With known pick-up devices, the variations of the diameter of the tube due to overpressure variations inside the tube are measured at two opposite points. Oscillations due to bending stress of the tube in the course of operation cause variations of the geometric shape of the cross section of the tube; thus the initial circular cross section of the tube changes to an oval one. The pick-up device registers variations of the diameter of the tube which are independent of the overpressure in the tube, that is, parasitic oscillations, and thus yields erroneous signals. Different electric filters, mostly low pass filters are therefore used with said known pick-up devices in order to suppress these parasitic oscillations. The real course of the overpressure in the tube is, however, thus distortes, since the signal then lacks the high frequency components, which are rather important for the analysis of the fuel injection process, for example.

SUMMARY OF THE INVENTION

It is an object of this invention to eliminate to a high degree the above-described drawbacks of the prior art, and to provide a pick-up device for this purpose which is not substantially affected by similar parasitic oscillations. The design of this pick-up device is based on the fact that the length of the external circumference of a tube in a plane perpendicular to the axis of the tube does not change, as a practical matter, due to elastic bending. The same also holds true for other hollow bodies. Contrary to such effect of elastic bending, the length of its circumference within the range of elastic deformations of the tube does change due to variations of internal overpressure.

The object of this invention is to provide a pick-up device, the body of which together with strong metal inserts as transmission elements and piezoelectric plats, presents a homogeneous unit of high stiffness. Such a pick-up device does not react to variations of the shape of the tube when its circumference remains of constant length, but reacts to changes of length of the circumference of the tube due to variations of its internal overpressure. The body of the pick-up device is elastic to such an extent as to maintain a linearity between variations of the internal overpressure and variations of the electric output signal. All these conditions are met with the pick-up device according to this invention.

DESCRIPTION OF THE DRAWING

An examplary embodiment of this pick-up device is shown in the attached drawing, wherein.

DESCRIPTION OF THE PREFERRED EMBODIMENT

Figure 2:
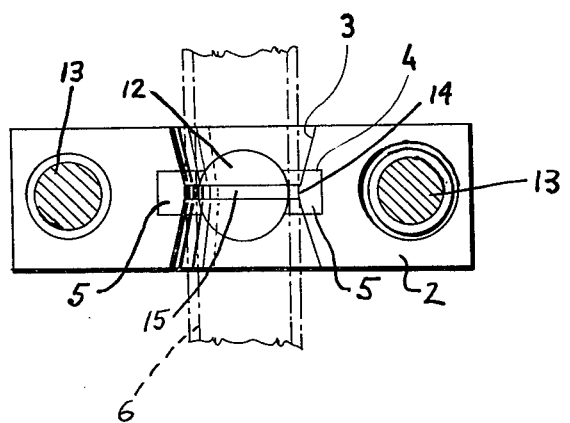
FIG. 2 is a top view of the lower part of the pick-up device.

The pick-up device has a body consisting of two similar parts 1 and 2 each having the shape of a yoke, upper part 1 and lower part 2 enclosing a cavity 3 in the shape of a double cone which is circular in cross section (FIG. 2). A transverse groove 4 housing a four-part steel insert 5, the internal diameter of which insert corresponds to the external diameter of the measured tube 6. As shown in FIG. 2, the radially inner surfaces of inserts 4 have oppositely disposed frusto-conical configurations at their axially opposite ends and a narrow-axially central circular cylindrical zone or band 14 which engages tube 6. Smaller oppositely disposed circular cavities 7 housing disc-like piezoelectric devices 8 are provided perpendicularly to the axis of the cavity 3 in the respective parts 1, 2 of the body of the pick-up device. Passages 9 terminating into the cavities 7 are bored in both parts 1, 2 of the body of the pick-up device, such passages 9 serving to receive cables (not shown), the ends of such cables being connected to contact plates 10 of the devices 8. The external electrode of each of the piezoelectric devices 8 rests against the respective contact plate 10, which in turn rests against an insulating washer 11 situated at the bottom of the cavity 7.

Figure 1:
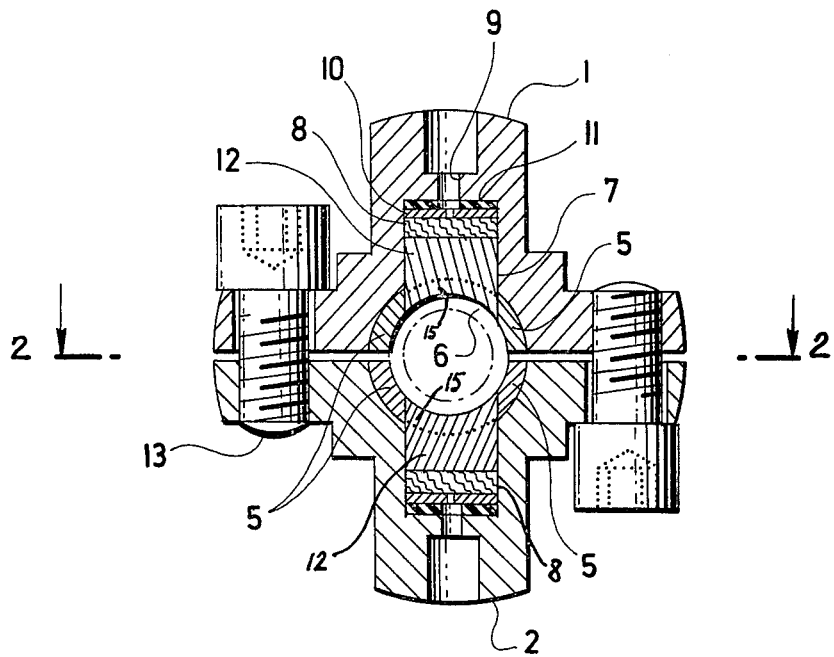
FIG. 1 is a sectional view of the pick-up device, the section taken along a plane perpendicular to the axis of the tube.

The internal electrode of each of the piezoelectric plates 8 rests against one part of a respective motion transmission element 12, the radially inner face of each element 12 contacting the surface of the measured tube 6. Such radially inner face of each element 12 is in the form of a blade with a part circular cylindrical inner surface 15 disposed in alignment with the inner faces of the axially central circular cylindrical zone of inserts 5, whereby, as clearly shown in FIG. 1, the aligned inner faces of the elements 12 and the inserts 5 cooperate to surround and accurately engage substantially the entire outer surface of the tube 6. Radially outwardly of the blade having surface 15 the elements 12 are of circular cylindrical configuration with their axes disposed normal to the axis of tube 6. Transmission elements 12 are also preferably made of steel. Both parts 1, 2 of the body of the pick-up device are affixed to the measured tube 6 with a predetermined prestress by means of screws 13, situated on both sides of the body 1, 2 of the pick-up device, which can be tightened by a torque wrench to a predetermined torque. This body is advantageously made of a light alloy in order to provide a smaller mass inertia and a smaller modulus of elasticity of the body of the pick-up device. All possible slots of the pick-up device are filled, for example, with epoxy resin. The clamping and measuring surfaces of parts 5 and 12 of the assembled pick-up device are machined to an exact geometric shape, relative to the tube 6 so that the aligned inner faces of the parts 5 and 12 collectively form an arc slightly less than 360° as shown in FIG. 1, thereby to form a gap or clearance between both parts 1, 2 of the body of the pick-up device adapted to permit its application on the measured tube 6 with a predetermined desired prestress.

The pick-up device according to this invention can be used for measuring the internal overpressure of hollow bodies, particularly of high pressure conduits.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A piezoelectric pick-up device for measuring the internal overpressure of a hollow cylindrical body on the basis of its elastic deformation, comprising a pick-up device having two opposed parts, a cavity provided in the pick-up device to enclose the measured cylindrical body therebetween, at least two opposed recesses in said pick-up device, a motion transmitting element and a piezoelectric plate arranged in each recess opposite to each other, each said motion transmitting element being arranged to provide mechanical communication between the associated piezoelectric plate and the outer surface of the measured body and being disposed symmetrically with respect to the axis of the measured body, a circular transverse groove machined in the cavity of the pick-up device, a multipart insert of a strong rigid metal fitting tightly in this circular groove, the radially inner surfaces of the motion transmitting elements and of the inserts forming circumferentially aligned segments cooperating to surround and accurately engage substantially the entire outer surface of the measured body, and means for clamping together the two parts of the pick-up device.

2. A piezoelectric pick-up device as in claim 1, wherein the aligned segments collectively form an arc slightly less than 360° so that a slot is provided between the two parts of the pick-up device when it is assembled on the measured body, the slot extending in a transverse plane disposed normal to the axis of the measured body, thereby permitting a clamping of the two parts of the pick-up device to the body with a predetermined prestress.

* * * * *